United States Patent [19]

Sano et al.

[11] Patent Number: 4,900,790

[45] Date of Patent: Feb. 13, 1990

[54] POLYETHYLENE RESIN COMPOSITION

[75] Inventors: Akira Sano, Kawasaki; Motohiko Yoshizumi; Hiroki Hirata, both of Omiya; Kazuo Matsuura, Tokyo; Hisahiko Suyama, Yokohama, all of Japan

[73] Assignees: Nippon Oil Company, Limited; Mitsubishi Metal Corporation, both of Tokyo, Japan

[21] Appl. No.: 340,446

[22] Filed: Apr. 19, 1989

[30] Foreign Application Priority Data

Apr. 21, 1988 [JP] Japan .................................. 63-96764

[51] Int. Cl.$^4$ ........................ C08L 23/28; C08L 23/04
[52] U.S. Cl. .................................... 525/192; 525/240; 525/199; 525/334.1
[58] Field of Search ..................... 525/199, 334.1, 240, 525/192

[56] References Cited

U.S. PATENT DOCUMENTS

| | | | |
|---|---|---|---|
| 3,125,547 | 3/1964 | Blatz ..................................... | 525/199 |
| 4,144,374 | 3/1979 | Lagow et al. ..................... | 525/334.1 |
| 4,753,995 | 6/1988 | Chu et al. ............................ | 525/199 |

*Primary Examiner*—Carman J. Seccuro
*Attorney, Agent, or Firm*—Dilworth & Barrese

[57] ABSTRACT

A polyethylene resin composition comprising (A) 50–99.9 parts by weight of an ethylene polymer and (B) 0.1–50 parts by weight of a modified ethylene polymer obtained by fluorinating an ethylene polymer having a density in the range of larger than 0.910 g/cm$^3$ and 0.970 g/cm$^3$; said ethylene polymer being prepared by polymerizing ethylene in the presence of a catalyst comprising a catalyst component containing at least one member selected from the group consisting of a titanium compound, vanadium compound and chromium compound, and optionally an organoaluminum compound.

6 Claims, No Drawings

POLYETHYLENE RESIN COMPOSITION

BACKGROUND OF THE INVENTION

The present invention relates to a polyethylene resin composition extremely superior in melt fluidity and more particularly to a polyethylene resin composition comprising an ethylene polymer and a fluorinated product of a specific ethylene polymer.

Polyethylene is widely used in various applications. Physical properties required of polyethylene differ according to uses, but moldability is an important physical property common to all applications. Good moldability permits increase of the molding speed and reduction of the power required for molding, thus leading to the improvement of productivity; besides, there will be obtained a molded article having a smooth surface, which leads to the attainment of a transparent film in the field of films.

SUMMARY OF THE INVENTION

The object of the present invention is to provide a polyethylene composition extremely superior in melt fluidity.

Having made extensive studies for attaining the above object, the present inventor found that a polyethylene resin composition extremely superior in the prevention of melt fracture without impaling the physical properties of the polyethylene originally possessed could be obtained by blending an ethylene polymer with a fluorinated product of a specific ethylene polymer. And thus we accomplished the present invention.

The present invention resides in a polyethylene resin composition characterized by containing:

(A) 50–99.9 parts by weight of an ethylene polymer and (B) 0.1–50 parts by weight of a modified ethylene polymer obtained by fluorinating an ethylene polymer having a density in the range of larger than 0.910 g/cm$^3$ and 0.970g/cm$^3$; said ethylene polymer being prepared by polymerizing ethylene in the presence of a catalyst comprising a catalyst component containing at least one member selected from the group consisting of a titanium compound, vanadium compound and chromium compound, and optically an organoaluminum compound.

The present invention will be described below in more detail.

(A) Ethylene Polymer

As the ethylene polymer, component (A), in the present invention there may be used a known ethylene polymer. Usually, an ethylene polymer having a melt index (as measured under the conditions of 190° C., 2.16 kg according to JIS K6760, hereinafter referred to as "MI") of 0.01 to 100 g/10 min, preferably 0.01 to 50 g/10 min and a density of 0.910 to 0.970 g/cm$^3$, is used. Examples of the ethylene polymer as referred to herein include, in addition to ethylene homopolymer, ethylene copolymers prepared by copolymerizing ethylene with not more than about 10 mol % of α-olefins of $C_3$ to $C_{12}$ such as propylene, butene-1, 4-methylpentene-1 and hexene-1. For example, mention may be made of those called high-density polyethylene, low-density polyethylene by a high pressure process, linear low-density polyethylene and mixtures thereof.

(B) Modified Ethylene Polymer

The modified ethylene polymer used as component (B) in the present invention is obtained by fluorinating a specific ethylene polymer. The term "ethylene polymer" as referred to in component (B) means not only an ethylene homopolymer but also an ethylene-α-olefin copolymer. Such ethylene polymers are prepared by homopolymerizing ethylene or copolymerizing ethylene with a small amount of α-olefin in the presence of a catalyst comprising a catalyst component containing at least one of a titanium compound, vanadium compound and a chromium compound, and optionally an organoaluminum compound. As the α-olefin there may be used on having 3 to 12, preferably 3 to 6, carbon atoms. Examples are propylene, butene-1, 4-methylpentene-1, hexene-1, octene-1, decene-1 and dodecene-1. Among them, propylene, butene-1, 4-methylpentene-1 and hexene-1 are particularly preferred. Dienes such as, for example, butadiene, 1,4-hexadiene, vinyl norbornene and ethylidene norbornene may also be used as comonomers. The α-olefin content in the ethylene-α-olefin copolymer is preferably 0.01–10 mol %, more preferably 0.1–5 mol %.

Examples of the catalyst system used include so-called Ziegler catalysts such as a catalyst comprising a catalyst component containing at least a titanium compound and/or a vanadium compound together with an organoaluminum compound. The titanium compound and/or vanadium compound may be used together with a magnesium compound.

Examples of the titanium compound and/or vanadium compound used in the present invention include halides, alkoxyhalides, alkoxides and halogenated oxides, of titanium and/or vanadium. As preferred examples of the titanium compound there may be mentioned tetravalent and trivalent titanium compounds. As tetravalent titanium compounds, those represented by the general formula Ti(OR)$_n$X$_{4-n}$ are preferred wherein R is an alkyl, aryl or aralkyl group having 1 to 24 carbon atoms, X is a halogen atom and n is $0 \leq n \leq 4$. Among them, titanium tetrachloride is preferred. As trivalent compounds there may be used, for example, titanium trihalides such as titanium trichloride, as well as trivalent titanium compounds obtained by reducing tetravalent alkoxytitanium halides of the general formula Ti(OR)$_m$X$_{4-m}$ with an organometallic compound of a metal selected from Groups I through III in the Periodic Table in which formula R is an alkyl, aryl or aralkyl group having 1 to 24 carbon atoms, X is a halogen atom and m is $0 \leq m \leq 4$. Examples of the vanadium compound include tetravalent vanadium compounds such as vanadium tetrachloride, vanadium tetrabromide, vanadium tetraiodide and tetraethoxyvanadium; pentavalent vanadium compounds such as vanadium oxytrichloride, ethoxydichlorovanadyl, triethoxyvanadyl and tributoxyvanadyl; and trivalent vanadium compounds such as vanadium trichloride and vanadium triethoxide.

The titanium and/or vanadium compound may also be treated with one or more electron donors. Examples of such electron donors include ethers, thioethers, thiolphosphines, stibines, arsines, amines, amides, ketones, esters and the like.

Examples of the magnesium compound which may be used together with the titanium compound and/or vanadium compound include metal magnesium, magnesium hydroxide, magnesium carbonate, magnesium oxide, magnesium chloride, as well as double salt, double oxide, carbonate, chloride and hydroxide each containing a magnesium atom and a metal selected from silicon, aluminum and calcium, those obtained by treating or reacting these inorganic solid compounds with oxygen-containing compounds, sulfur-containing compounds, aromatic hydrocarbons or halogen-containing materials, and those obtained by incorporating one of the above magnesium compounds into a silicon- or aluminum-containing oxide.

When using the titanium compound and/or vanadium compound together with the magnesium compound, the method for contacting both components is not specially limited and there may be adopted a known method.

Examples of the above oxygen-containing compounds include water and organic oxygen-containing compounds such as alcohols, phenols, ketones, aldehydes, carboxylic acids, esters, polysiloxanes and acid amides, as well as inorganic oxygen-containing compounds such as metal alkoxides and metal oxychlorides. As examples of the above sulfur-containing compounds are mentioned organic sulfur-containing compounds such as thiols, thioethers and the like, and inorganic sulfur-containing compounds such as sulfur dioxide, sulfur trioxide, sulfuric acid and the like. As examples of the above aromatic hydrocarbons are mentioned mono- and polycyclic aromatic hydrocarbons such as benzene, toluene, xylene, anthracene and phenanthrene. As examples of the above halogen-containing compounds are mentioned chlorine, hydrogen chloride, metal chlorides and organic halides.

As other examples of catalyst systems are mentioned a combination of an organoaluminum compound with a reaction product as a solid catalyst component obtained by the reaction of an organomagnesium compound such as so-called Grignard compound with a titanium compound and a combination of an organoaluminum compound with a solid product obtained by contacting the above inorganic oxide as $SiO_2$ or $Al_2O_3$ with the solid catalyst component containing at least magnesium and titanium.

In these catalyst systems the titanium compound may be used as an adduct with an organocarboxylic acid ester, and the above magnesium-containing inorganic solid compound may be used after contact treatment with an organic carboxylic acid ester. Moreover, the organoaluminum compound may be used as an adduct with an organocarboxylic acid ester. Further, the catalyst systems may be prepared in the presence of an organic carboxylic acid ester.

As examples of the organometallic compound used in the present invention are mentioned organometallic compounds of which metals belong to Groups I-IV in the Periodic Table which are known as a component of a Ziegler type catalyst. Organoaluminum compounds represented by the general formula $R_nAlX_{3-n}$ wherein R is an alkyl or aryl group having 1 to 20 carbon atoms, X is a halogen atom and $0 \leq n \leq 3$, and organozinc compounds represented by the general formula $R_2Zn$ wherein Rs, which may be the same or different, are each an alkyl group having 1 to 20 carbon atoms are preferred. Mixtures thereof may also be used.

The amount of the organoaluminum compound used is not specially limited, but usually it is in the range of 0.1 to 1,000 mols per mol of the titanium compound and/or vanadium compound.

As other examples of catalyst systems are mentioned so called Phillips type catalysts. Concrete examples include those supported chromium trioxide or a compound which on calcining forms chromium oxide at least partially on an inorganic oxide carrier.

As examples of the inorganic oxide carrier are mentioned silica, alumina, silica-alumina, titania, zirconia, thoria, and mixtures thereof, with silica and silica-alumina being preferred.

As examples of the chromium compound to be supported are mentioned oxides of chromium and compounds which on calcining form chromium oxides at least partially, such as halides, oxyhalides, nitrate, acetate, sulfate and alcoholates of chromium. More concrete examples are chromium trioxide, chromyl chloride, potassium dichromate, ammonium chromate, chromium nitrate, chromium acetate, chromium acetylacetonate and di-tert-butyl chromate.

The chromium compound may be supported on the carrier by a known method such as impregnation, solvent distilling-off or sublimation. A suitable method may be selected according to the kind of the chromium compound used. The amount of chromium to be supported is in the range of 0.1 to 10, preferably 0.3 to 5, more preferably 0.5 to 3, in terms of weight percent of chromium atom based on the weight of the carrier.

The carrier with the chromium compound thus supported thereon is then calcined to effect activation. This calcining operation for activation is generally carried out in a substantially water-free non-reducing atmosphere, for example, in the presence of oxygen. But it may be done in the presence of an inert gas or under reduced pressure. Preferably, dry air is used. Other conditions for the calcination involve a temperature not lower than 450° C., preferably in the range of 500° to 900° C., and a period of time in the range of several minutes to several hours, preferably 0.5 to 10 hours. It is desirable that the calcination be performed using a thoroughly dry air to effect activation in a fluidized state. The catalyst thus supporting the chromium compound may be reduced with carbon monoxide, ethylene, an organoaluminum compound or the like.

As examples of the organoaluminum compound are mentioned triethylaluminum, triisobutylaluminum, tri-n-hexylaluminum, diethylaluminum chloride, monoethoxy dialkylaluminum, diethoxy monoalkylaluminum and those having 2-100, preferably 2-50, of the linkage represented by the general formula

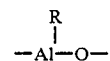

wherein R is a hydrocarbon group having 1 to 18 carbon atoms of which linkage is obtained by the reaction of a trialkylaluminum and water.

The polymerization reaction is performed in a substantially oxygen- and water-free condition in vapor phase or in the presence of an inert solvent or using monomer per se as solvent. Olefin polymerizing conditions involve temperatures in the range of −20° to 110° C., preferably 0° to 90° C., and pressures in the range from normal pressure to 70 kg/cm²·G, preferably 2 kg/cm²·G or 60 kg/cm²·G. The molecular weight can be adjusted to some extent by changing polymerization conditions such as polymerization temperature and catalyst mol ratio, but the addition of hydrogen into the polymerization system is more effective for this purpose. Of course, two or more multi-stage polymerization reactions involving different polymerization conditions such as different hydrogen concentrations and different polymerization temperatures can be carried out without any trouble.

The melt index (MI, measured at 190° C. and 2.16 kg according to JIS K 6760) of the ethylene polymer thus prepared is in the range of 0.01 to 100 g/10 min, preferably 0.1 to 50 g/10 min. Its density (according to JIS K 6760) is in the range of greater than 0.910 g/cm$^3$ to 0.970 g/cm$^3$, preferably in the range of greater than 0.910 g/cm$^3$ to 0.940 g/cm$^3$.

The method of fluorinating the ethylene polymer thus prepared is not specially limited. But, preferably, a powder or pellets of the polymer are reacted with fluorine gas or a gaseous mixture of fluorine gas and an inert gas such as, for example, helium or argon at 0°-120° C., preferably 20°-90° C. Or there may be used a method wherein a fluorine compound such as ammonium fluoride is blended with the polymer in advance and then heating is made up to a temperature at which the fluorine compound will decompose and liberate fluorine, allowing the liberated fluorine to react with the polymer.

The fluorine content of the thus-fluorinated ethylene polymer is about 0.1-50 wt %, preferably about 0.5-30 wt %, more preferably about 1-20 wt %.

(C) Blending

The polyethylene resin composition of the present invention is obtained by blending the thus-obtained ethylene polymer (A) and modified ethylene polymer (B) together.

The blending ratio of the components (A) and (B) is, in terms of component (A) : component (B). 50-99.9:0.1-50 parts by weight, preferably 70-99:1-30 parts by weight, more preferably 80-98:2-20 parts by weight.

As the blending method there may be adopted any known method. Typical examples are mechanical melt-kneading methods using uni- and biaxial extruders, Bumbury's mixer, various kneaders, and rolls. There also may be used a method wherein the components are blended by being dissolved in a solvent.

In such mechanical melt-kneading methods, the blending operation is performed usually at a temperature in the range of 150° to 300° C. And additives, e.g. antioxidant, may be added as necessary before, after or at the time of the blending.

The polyethylene resin composition of the present invention obtained in the manner described above is extremely superior in the prevention of melt fracture at a high shear rate, thus permitting a high-speed molding without imparing the superior properties of the polyethylene originally possessed; besides, it can afford molded articles having smooth surfaces. Particularly, the composition of the invention exhibits high moldability in extrusion, so that when formed into film by inflation or T-die extrusion, the film is greatly improved in its utility value, having an extremely high transparency.

The following examples are given to illustrate the present invention more concretely, but it is to be understood that the invention is not limited thereto.

EXAMPLE 1

(a) Preparation of Ethylene Polymer I

Ethylene and butene were copolymerized using a catalyst comprising triethyl aluminum and a solid catalyst component obtained from substantially anhydrous magnesium chloride, 1,2-dichloroethane and titanium tetrachloride. The ethylene polymer I had a butene-1 content of 4.0 mol %, a melt index of 0.8 g/10 min and a density of 0.921 g/cm$^3$.

(b) Modification of the Ethylene Polymer by Fluorination Treatment

Then, a modified ethylene copolymer I was obtained by fluorinating the ethylene-butene-1 copolymer with a gaseous mixture (fluorine/argon=25/75 volume ratio) at 90° C. for 1 hour. The modified ethylene polymer exhibited a weight increase of 10.5% as compared with the polymer weight before the fluorination treatment. In terms of the fluorine content in the modified copolymer such weight increase corresponds to about 10 wt %.

(c) Melt Fluidity Test 98 parts by weight of a linear low-density polyethylene (trade name: Nisseki LINIREX AF 1210, a product of Nippon Petrochemicals Co., Ltd.) [component (A)] having an MI of 0.8 g/10 min and a density of 0.921 g/cm$^3$ and 2 parts by weight of the modified ethylene polymer obtained in (b) [component (B)] were mixed thoroughly and then pelletized using an extruder having an indise diameter of 50 mm and a screw L/D ratio of 26 at 200° C.

The pellets thus obtained were placed in the cylinder portion of a capillary rheometer, a product of Instron Co., equipped with a die having a diameter of 0.0301 inch and a length of 1.0059 inches and held at 190° C. for 10 minutes, then extruded at the same temperature and at six stages of extrusion speeds of 0.06, 0.2, 0.6, 2, 6 and 20 cm/min. Shear rates at those extrusion speeds were 16.3, 54.3, 162.8, 542.5, 1628 and 5425 checked for surface state and melt fracture to find that no melt fracture was observed up to the shear rate of 5430 sec$^{-1}$.

EXAMPLE 2

A polyethylene resin composition was prepared in the same way as in Example 1(c) except that there were used 97 parts by weight of a high-density polyethylene (trade name: Nisseki Staflene E809(M), a product of Nippon Petrochemicals Co., Ltd.) having an MI of 0.9 g/10 min and a density of 0.950 g/cm$^3$ in place of the linear low-density polyethylene as well as 3 parts by weight of the modified ethylene polymer obtained in Example 1(b). Then, using the polyethylene resin composition thus prepared, a melt fluidity test was conducted in the same manner as in Example 1(c). As a result, no melt fracture was observed up to the shear rate of 5430 sec$^{-1}$.

EXAMPLE 3

A polyethylene resin composition was prepared in the same way as in Example 1(c) except that there were used 99 parts by weight of a low-density polyethylene (trade name: Nisseki Rexlon F22, a product of Nippon Petrochemicals Co., Ltd.) having an MI of 1.0 g/10 min and a density of 0.924 g/cm$^3$ in place of the linear low-density polyethylene as well as 1 part by weight of the modified ethylene polymer obtained in Example 1(b). Then, using the polyethylene resin composition thus obtained, a melt fluidity test was conducted in the same manner as in Example 1(c). As a result, no melt fracture was observed up to the shear rate of 5425 sec$^{-1}$.

EXAMPLES 4-6

Fluorination was performed in the same way as in Example 1(b) except that the volume ratios of fluorine-/argon, and the temperatures and times of contacting the mixed gas and the ethylene polymer were changed as shown in Table 1 to obtain modified ethylene polymers (II-IV).

TABLE 1

| Ex. No. | $F_2/Ar$ (vol. ratio) | Temp. (°C.) | Time (min) | % Weight Increase F Treatment | Modified Ethylene Polymer |
| --- | --- | --- | --- | --- | --- |
| 4 | 40/60 | 90 | 60 | 11.8 | II |
| 5 | 25/75 | 90 | 5 | 1.6 | III |
| 6 | 25/75 | 25 | 60 | 3.8 | IV |

Melt fluidity tests were conducted in the same manner as in Example 1(c) with respect to components (A)/components (B) as shown Table 2.

EXAMPLE 7

(a) Preparation of Ethylene Polymer II Ethylene was polymerized using a catalyst comprising triethylaluminium and a solid catalyst component obtained from substantially anhydrous magnesium chloride, anthracene and titanium tetrachloride. The ethylene polymer had a melt index of 1.0 g/10 min and a density of 0.965 g/cm$^3$.

(b) Modification of the Ethylene Polymer by Fluorination Treatment

A modified ethylene polymer V was obtained by fluorinating the ethylene polymer obtained above using the same procedure as Example 1(b). The modified ethylene polymer exhibited right increase of 8.7% as compared with the untreated polymer.

(c) Melt Fluidity Test

The procedure of Example 1(c) was repeated except that the modified ethylene polymer V was used instead of the modified ethylene polymer I as Component (B) in the proportion shown in Table 2. No melt fracture was observed up to the shear rate of 5430 sec$^{-1}$ in the same melt fluidity test as in Example 1(c).

EXAMPLE 8

The procedure of Example 2 was repeated except that the modified ethylene polymer V was used instead of the modified ethylene polymer I as Component (B) in the proportion shown in Table 2. No melt fracture was observed up to the shear rate of 5430 sec$^{-1}$ in the same melt fluidity test as in Example 2.

EXAMPLE 9

The procedure of Example 3 was repeated except that the modified ethylene polymer V was used instead of the modified ethylene polymer I as Component (B) in the proportion shown in Table 2. No melt fracture was observed up to the shear rate of 5430 sec$^{-1}$ in the same melt fluidity test as in Example 3.

EXAMPLE 10

(a) Preparation of Ethylene Polymer I

Ethylene and butene-1 were copolymerized using a catalyst comprising diethylaluminum chloride and a catalyst component comprising propylene oxide and titanium tetrachloride. This ethylene polymer had a butene-1 content of 2.8 mol %, a melt index of 0.7 g/10 min and a density of 0.925 g/cm$^3$.

(b) Modification of the Ethylene Polymer by Fluorination Treatment

A modified ethylene polymer VI was obtained by fluorinating the ethylene polymer obtained above using the same procedure as Example 1(b). The modified ethylene polymer exhibited a weight increase of 9.8% as compared with the untreated polymer.

(c) Melt Fluidity Test

The procedure of Example 1(c) was repeated except that the modified ethylene polymer VI was used instead of the modified ethylene polymer I as Component (B) in the proportion shown in Table 2. No melt fracture was observed up to the shear rate of 5430 sec$^{-1}$ in the same melt fluidity test as in Example 1(c).

EXAMPLE 11

(a) Preparation of Ethylene Polymer

Ethylene and butene-1 were copolymerized using the same method as Example 1(a) except that, instead of titanium tetrachloride, $VO(OC_2H_5)_3$ and titanium tetrachloride were employed to obtain an ethylene polymer having a butene-1 content of 3.9 mol %, a melt index of 1.2 g/10 min and a density of 0.919 g/cm$^3$.

(b) Modification of the Ethylene Polymer by Fluorination Treatment

A modified ethylene polymer VII was obtained by fluorinating the ethylene polymer obtained above using the same procedure as Example 1(b). The modified ethylene polymer exhibited a weight increase of 11.1% as compared with the untreated polymer.

(c) Melt Fluidity Test

The procedure of Example 1(c) was repeated except that the modified ethylene polymer VII was used instead of the modified ethylene polymer I as Component (B). No melt fracture was observed up to the shear rate of 5430 sec$^{-1}$ in the same melt fluidity test as in Example 1(c).

EXAMPLE 12

(a) Preparation of Ethylene Polymer

Ethylene and butene-1 were copolymerized in gas phase using a catalyst comprising triethylaluminium and a solid catalyst component comprising silica (Fuji-Davison #952) which was sintered at 600° C. and treated with tetraethoxy silane, substantially anhydrous magnesium chloride, aluminium ethoxide, tetraethoxy silane and titanium tetrachloride. The ethylene polymer VIII had a butene-1 content of 4.1 mol %, a melt index of 1.0 g/10 min and a density of 0.920 g/cm$^3$.

(b) Modification of the Ethylene Polymer by Fluorination Treatment

A modified ethylene polymer VIII was obtained by fluorinating the ethylene polymer obtained above using the same procedure as Example 1(b). The modified ethylene polymer exhibited a weight increase of 10.8% as compared with the untreated polymer.

(c) Melt Fluidity Test

The procedure of Example 1(c) was repeated except that the modified ethylene polymer VIII was used instead of the modified ethylene polymer I as Component (B). No melt fracture was observed up to the shear rate of 5430 sec$^{-1}$ in the same melt fluidity test as in Example 1(c).

EXAMPLE 13

(a) Preparation of Ethylene Polymer

Ethylene was polymerized in gas phase using a catalyst obtained by supporting 1% by weight of chromium oxide on silica (Fuji-Davison #952) which was sintered at 600° C. and activating at 700° C. for 10 hours. This ethylene polymer VI had a melt index of 0.1 g/10 min and a density of 0.965 g/cm$^3$.

(b) Modification of the Ethylene Polymer by Fluorination Treatment

A modified ethylene polymer IX was obtained by fluorinating the ethylene polymer obtained above using the same procedure as Example 1(b). The modified ethylene polymer exhibited a weight increase of 8.4% as compared with the untreated polymer.

(c) Melt Fluidity Test

The procedure of Example 1(c) was repeated except that the modified ethylene polymer IX was used instead of the modified ethylene polymer I as Component (B) in the proportion shown in Table 2. No melt fracture was observed up to the shear rate of 5430 sec$^{-1}$ in the same melt fluidity test as in Example 1(c).

COMPARATIVE EXAMPLE 1

The procedure of Example 1(c) was repeated except that the ethylene polymer I (unmodified) obtained in Example 1(a) was used instead of the modified ethylene polymer I obtained in Example 1(b) as Component (B). Melt fracture was observed at the shear rate of 543 sec$^{-1}$ in the same melt fluidity test as in Example 1(c).

COMPARATIVE EXAMPLE 2

The procedure of Example 2 was repeated except that the ethylene polymer I (unmodified) obtained in Example 1(a) was used instead of the modified ethylene polymer I obtained in Example 1(b) as Component (B). Melt fracture was observed at the shear rate of 163 sec$^{-1}$ in the same melt fluidity test as in Example 2.

COMPARATIVE EXAMPLE 3

The procedure of Example 3 was repeated except that the ethylene polymer I (unmodified) obtained in Example 1(a) was used instead of the modified ethylene polymer I obtained in Example 1(b) as Component (B). Melt fracture was observed at the shear rate of 1628 sec$^{-1}$ in the same melt fluidity test as in Example 3.

COMPARATIVE EXAMPLE 4

The procedure of Example 7(c) was repeated except that the ethylene polymer II (unmodified) obtained in Example 7(a) was used instead of the modified ethylene polymer V obtained in Example 7(b) as Component (B). Melt fracture was observed at the shear rate of 543 sec$^{-1}$ in the same melt fluidity test as in Example 7(c).

COMPARATIVE EXAMPLE 5

The procedure of Example 8 was repeated except that the ethylene polymer II (unmodified) obtained in Example 7(a) was used instead of the modified ethylene polymer V obtained in Example 7(b) as Component (B). Melt fracture was observed at the shear rate of 163 sec$^{-1}$ in the same melt fluidity test as in Example 8.

COMPARATIVE EXAMPLE 6

The procedure of Example 9 was repeated except that the ethylene polymer II (unmodified) obtained in Example 7(a) was used instead of the modified ethylene polymer V obtained in Example 7(b) as Component (B). Melt fracture was observed at the shear rate of 1628 sec$^{-1}$ in the same melt fluidity test as in Example 9.

COMPARATIVE EXAMPLE 7

In Example 1(c), the melt fluidity test was conducted with only the linear low density polyethylene used as Component (A). Melt fracture was observed at the shear rate of 543 sec$^{-1}$.

COMPARATIVE EXAMPLE 8

In Example 2, the melt fluidity test was conducted with only the high density polyethylene used as Component (A). Melt fracture was observed at the shear rate of 163 sec$^{-1}$.

COMPARATIVE EXAMPLE 9

In Example 3, the test of melt fluidity was conducted with only the low density polyethylene used as Component (A). Melt fracture was observed at the shear rate of 1628 sec$^{-1}$.

TABLE 2

| No. | Component (A) | Component (B) | Weight ratio Component (A) Component (B) | Shear Rate: Melt Fracture observed |
|---|---|---|---|---|
| Ex. 1 | LLDPE | MEP I | 98/2 | 5430 sec$^{-1}$ |
| Ex. 2 | HDPE | MEP I | 97/3 | 5430 sec$^{-1}$ |
| Ex. 3 | LDPE | MEP I | 99/1 | 5430 sec$^{-1}$ |
| Ex. 4 | LLDPE | MEP II | 99/1 | 5430 sec$^{-1}$ |
| Ex. 5 | LLDPE | MEP III | 80/20 | 5430 sec$^{-1}$ |
| Ex. 6 | LLDPE | MEP IV | 90/10 | 5430 sec$^{-1}$ |
| Ex. 7 | LLDPE | MEP V | 96/4 | 5430 sec$^{-1}$ |
| Ex. 8 | HDPE | MEP V | 95/5 | 5430 sec$^{-1}$ |
| Ex. 9 | LDPE | MEP V | 98/2 | 5430 sec$^{-1}$ |
| Ex. 10 | LLDPE | MEP VI | 97/3 | 5430 sec$^{-1}$ |
| Ex. 11 | LLDPE | MEP VII | 98/2 | 5430 sec$^{-1}$ |
| Ex. 12 | LLDPE | MEP VIII | 98/2 | 5430 sec$^{-1}$ |
| Ex. 13 | LLDPE | MEP IX | 95/5 | 5430 sec$^{-1}$ |
| Com. Ex. 1 | LLDPE | EP I (unmfd) | 98/2 | 543 sec$^{-1}$ |
| Com. Ex. 2 | HDPE | EP I (unmfd) | 97/3 | 163 sec$^{-1}$ |
| Com. Ex. 3 | LDPE | EP I (unmfd) | 99/1 | 1628 sec$^{-1}$ |
| Com. Ex. 4 | LLDPE | EP II (unmfd) | 96/4 | 543 sec$^{-1}$ |

TABLE 2-continued

| No. | Component (A) | Component (B) | Weight ratio Component (A) Component (B) | Shear Rate: Melt Fracture observed |
|---|---|---|---|---|
| Com. Ex. 5 | HDPE | EP II (unmfd) | 95/5 | 163 sec$^{-1}$ |
| Com. Ex. 6 | LDPE | EP II (unmfd) | 98/2 | 1628 sec$^{-1}$ |
| Com. Ex. 7 | LLDPE | None | 100/0 | 543 sec$^{-1}$ |
| Com. Ex. 8 | HDPE | None | 100/0 | 163 sec$^{-1}$ |
| Com. Ex. 9 | LDPE | None | 100/0 | 1628 sec$^{-1}$ |

(Note)
LLDPE: linear low density polyethylene
HDPE: high density polyethylene
LDPE: low density polyethylene
MEP: modified ethylene polymer
EP: ethylene polymer
(unmfd): (unmodified)

What is claimed is:

1. A polyethylene resin composition which comprises:
   (A) 50-99.9 parts by weight of an ethylene polymer and
   (B) 0.1-50 parts by weight of a modified ethylene polymer obtained by fluorinating an ethylene polymer having a density in the range of larger than 0.910 g/cm$^3$ to 0.970 g/cm$^3$; said ethylene polymer being prepared by polymerizing ethylene in the presence of a catalyst comprising a catalyst component containing at least one member selected from the group consisting of a titanium compound, vanadium compound and chromium compound, and optionally an organoaluminum compound.

2. A polyethylene resin composition according to claim 1, wherein the ethylene polymer (A) is a ethylene homopolymer or a copolymer of ethylene and an α-olefin having 3-12 carbon atoms of up to about 10 mol% and has a density in the range of 0.910 to 0.970 g/cm$^3$.

3. A polyethylene resin composition according to claim 1, wherein the ethylene polymer constituting the modified ethylene polymer (B) is an ethylene homopolymer or a copolymer of ethylene and an α-olefin having 3-12 carbon atoms of up to about 10 mol %.

4. A polyethylene resin composition according to claim 1, wherein the modified ethylene polymer (B) has a fluorine content in the range of about 0.1% to about 50% by weight.

5. A polyethylene resin composition according to claim 1, wherein the modified ethylene polymer (B) has a fluorine content in the range of about 1% to about 20% by weight.

6. A polyethylene resin composition as set forth in claim 1, wherein the ratio of the ethylene polymer (A) to the modified ethylene polymer (B) is 80-98 parts by weight: 2-20 parts by weight.

* * * * *